P. HÄNEL.
BEATING APPARATUS, ESPECIALLY FOR THE MANUFACTURE OF CHOCOLATE.
APPLICATION FILED NOV. 27, 1912.
1,189,941.
Patented July 4, 1916.
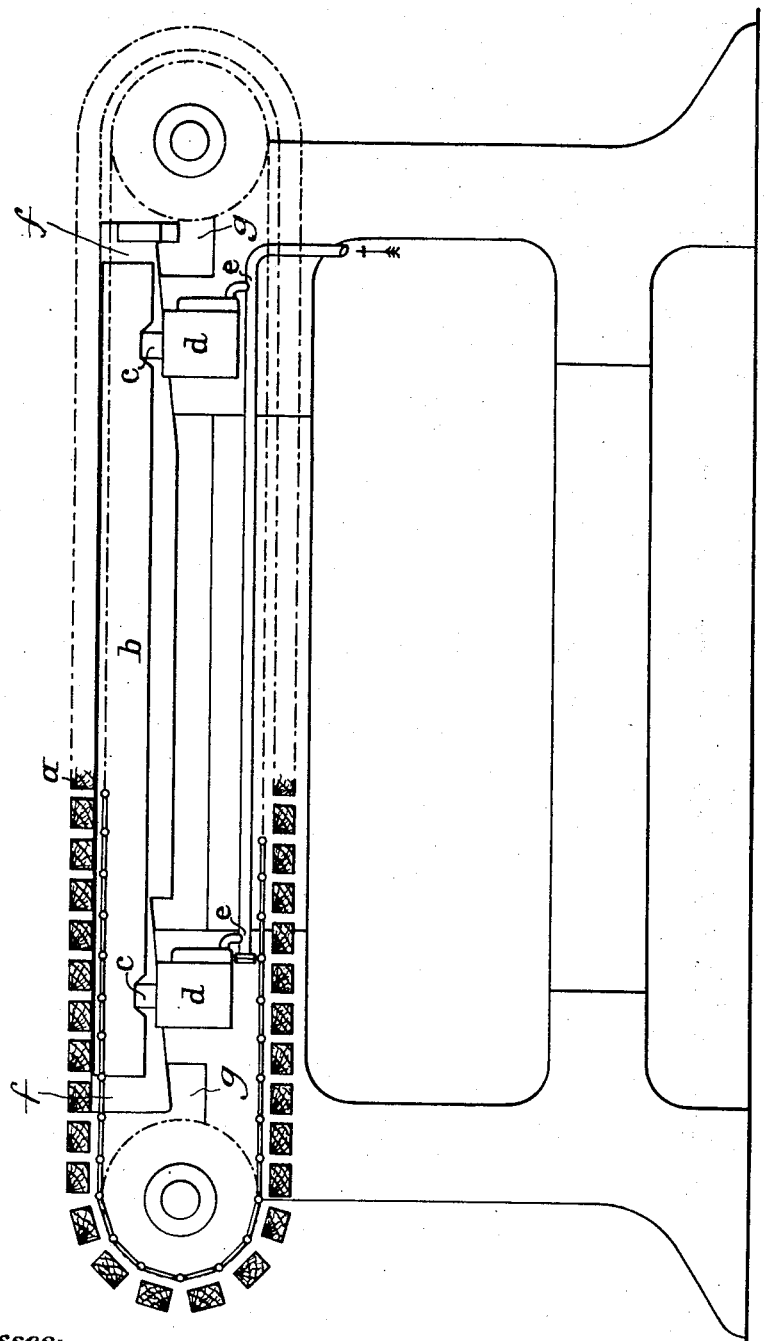

UNITED STATES PATENT OFFICE.

PAUL HÄNEL, OF DRESDEN, GERMANY, ASSIGNOR TO LOUIS BERNHARD LEHMANN, OF DRESDEN, GERMANY.

BEATING APPARATUS, ESPECIALLY FOR THE MANUFACTURE OF CHOCOLATE.

1,189,941.      Specification of Letters Patent.      Patented July 4, 1916.

Application filed November 27, 1912. Serial No. 733,750.

*To all whom it may concern:*

Be it known that I, PAUL HÄNEL, a subject of the King of Saxony, German Empire, and resident of Hohestrasse 65, Dresden, Kingdom of Saxony, German Empire, have invented a new and useful Beating Apparatus, Especially for the Manufacture of Chocolate, of which the following is a specification.

In the known beating apparatus especially used for the manufacture of chocolate and driven by hammers, the hammer-works consisting of a great number of mechanically moved parts show the drawback that the blows caused by them are produced with relatively low speed and, during one unit of time, in a small number. Another drawback of the hammer-works mentioned is seen in the fact that they produce a disagreeable noise and necessitate a lot of room, if the beating apparatus is arranged of the usual large length. Besides this, the known mechanical beating-hammers are of a complicated construction, by which they are subject to a rapid wear and tear increased still by the few and intensive blows obtained within the unit of time in spite of the very rapid motion of many parts, so that their effect is not sufficient.

These drawbacks enumerated above are prevented by the beating apparatus forming the object of the present invention and provided with a table or plate moved by a hammer-work, which, according to the present invention, consists of percussive hammers driven by compressed air.

By the use of the percussive hammers of *per se* known construction and driven by compressed air the advantage is obtained that the blows produced within the unit of time may be controlled at will and highly increased in number compared with the blows obtained by the known beating hammers. Furthermore, the increase of the number of the blows obtained within the unit of time allows that the blows need not be so intensive for obtaining the same effect, so that the intensity and the noise of the blows may essentially be reduced by the larger number and the more rapid succession of said blows. Besides this, the entire plant of the beating-apparatus constructed of considerable length is essentially simplified by the arrangement of the compressed air hammers, as it will be necessary only to conduct the stationary pipes for the compressed air to the stationary hammer casings. As these parts are not moved, they are not exposed to any damage and wear and tear, whereby another considerable advantage is insured in comparison with the known beating-hammers.

The drawing illustrates an embodiment of the invention.

The table denoted by $a$ is formed by battens or bars fastened to traveling endless chains. This table is supported on the supports or agitator bars $b$ resting on the heads $c$ of the hammers $d$ actuated by compressed air and of suitable construction. A compressed-air conduit or pipe $e$ common to all hammers is advantageously connected to the hammers $d$ driven by compressed air in such a manner that on opening said conduit or pipe, the heads $c$ of the hammers move in an upward direction the carriers $b$, by which, in consequence of this movement, the table or plate is moved with high speed in an upward direction. After the escape of the compressed air the table or plate will be allowed to at once freely fall down. In this manner a very advantageous beating action causing only a very little noise will be obtained in the simplest possible manner by the device described. The extent to which the table may be raised, and consequently the distance it is permitted to drop, is preferably regulated by the carriers $f$, resting at their respective ends upon suitable support brackets $g$. The ends of the carriers $f$, at their points of support, are inclined, as are also the supporting surfaces of the brackets $g$, so that by adjusting the lateral position of the brackets $g$, the height of the carriers $f$ may be regulated.

What I claim is:

1. In an apparatus of the class described, a frame, endless chains, cross bars extending between and connected to the links of said endless chains, carriers upon which the said cross bars rest and slide, means for adjusting the position of the said carriers to determine the extent to which the cross bars may be raised and permitted to fall, agitator bars, and percussive air hammers for actuating the said agitator bars to raise the said cross bars when compressed air is supplied thereto and permitting the said cross bars to drop suddenly and freely when the supply of air is cut off therefrom.

2. In an apparatus of the class described, a frame, endless chains, cross bars extending between and connected to the links of said chains, carrier bars upon which the said cross bars, at their ends, rest and slide, adjustable support brackets for the said carrier bars to determine the elevation of the same, agitator bars connected to the said cross bars, and percussive air hammers for actuating the said agitator bars to raise the said cross bars when compressed air is supplied thereto and permitting the said cross bars to drop suddenly and freely when the supply of air is cut off therefrom.

3. In an apparatus for molding chocolate tablets, the combination of a table for supporting molds, consisting of spaced apart parallel endless chains and closely spaced cross bars extending entirely across the apparatus and connected to the links of said chains, carriers for supporting said table, and percussive air hammers for raising said carriers, chains and cross bars and permitting the same to fall downward freely.

In testimony that I claim the foregoing as my invention I have signed my name in presence of two witnesses this 5th day of November, 1912.

PAUL HÄNEL.

Witnesses:
  WILHELM E. SCHWARTZKOPF,
  PAUL ARRAS.

Copies of this patent may be obtained for five cents each, by addressing the "Commissioner of Patents Washington, D. C."